United States Patent [19]
Wichterle

[11] 3,822,089
[45] July 2, 1974

[54] CONTACT LENS BLANK OR REPLICA MADE FROM ANHYDROUS, SPARINGLY CROSS-LINKED HYDROPHILIC COPOLYMERS

[75] Inventor: Otto Wichterle, Prague, Czechoslovakia

[73] Assignee: Ceskoslovenska Akademie Ved., Praha, Czechoslovakia

[22] Filed: Oct. 7, 1971

[21] Appl. No.: 187,531

Related U.S. Application Data

[60] Division of Ser. No. 762,618, Sept. 25, 1968, Pat. No. 3,699,089, which is a continuation-in-part of Ser. No. 318,627, Oct. 24, 1963, abandoned, and a continuation-in-part of Ser. No. 393,506, Sept. 1, 1964, abandoned, and a continuation-in-part of Ser. No. 423,034, Jan. 4, 1965, Pat. No. 3,408,429, and a continuation-in-part of Ser. No. 424,065, Jan. 7, 1965, Pat. No. 3,361,858, and a continuation-in-part of Ser. No. 468,908, July 1, 1965, Pat. No. 3,496,254, and a continuation-in-part of Ser. No. 538,978, March 31, 1966, abandoned, and a continuation-in-part of Ser. No. 551,873, May 23, 1966, Pat. No. 3,499,682, and a continuation-in-part of Ser. No. 616,208, Feb. 15, 1967, Pat. No. 3,542,907.

[52] U.S. Cl.............. 351/160, 161/2, 161/408, 161/409, 260/33.4 R, 260/86.1 R, 260/86.1 E, 260/86.1 N, 264/1

[51] Int. Cl............................................. G02c 7/04
[58] Field of Search..... 260/86.1 R, 86.1 E, 86.1 N, 260/33.4 R; 351/160; 161/2, 256, 408, 409, 410; 264/1

[56] References Cited
UNITED STATES PATENTS

| | | | |
|---|---|---|---|
| 2,976,576 | 3/1961 | Wichterle et al. | 264/1 |
| 3,218,305 | 11/1965 | Krieble | 260/86.1 R |
| 3,247,171 | 4/1966 | Walker et al. | 260/86.1 N |
| 3,361,858 | 1/1968 | Wichterle | 260/86.1 R |
| 3,400,103 | 9/1968 | Samour et al. | 260/86.1 E |
| 3,408,429 | 10/1969 | Wichterle | 260/86.1 R |
| 3,496,254 | 2/1970 | Wichterle | 260/86.1 R |
| 3,497,577 | 2/1970 | Wichterle | 264/1 |
| 3,499,862 | 3/1970 | Wichterle | 260/86.1 R |
| 3,515,579 | 6/1970 | Shepherd et al. | 260/86.1 R |
| 3,542,907 | 11/1970 | Wichterle | 260/86.1 R |
| 3,575,123 | 4/1971 | Shepherd | 161/410 |

*Primary Examiner*—Allan Lieberman
*Attorney, Agent, or Firm*—Cushman, Darby & Cushman

[57] ABSTRACT

A substantially anhydrous sparingly cross-linked hydrophilic polymer capable of being swollen when in contact with water is prepared. The polymer is useful in preparing a contact lens.

16 Claims, No Drawings

CONTACT LENS BLANK OR REPLICA MADE FROM ANHYDROUS, SPARINGLY CROSS-LINKED HYDROPHILIC COPOLYMERS

This is a division of application Ser. No. 762,618, filed Sept. 25, 1968, now U.S. Pat. No. 3,699,089. Application Ser. No. 762,618 is a continuation-in-part of application Ser. No. 318,627, Oct. 24, 1963, now abandoned; application Ser. No. 393,506 filed Sept. 1, 1964, now abandoned; application Ser. No. 423,034, filed Jan. 4, 1965 and now U.S. Pat. No. 3,408,429, dated Oct. 28, 1969; application Ser. No. 424,065, filed Jan. 7, 1965 and now U.S. Pat. No. 3,361,858, dated Jan. 2, 1968; application Ser. No. 468,908, filed July 1, 1965 and now U.S. Pat. No. 3,496,254, dated Feb. 17, 1970; application Ser. No. 538,978 filed Mar. 31, 1966, now abandoned; application Ser. No. 551,873; filed May 23, 1966 and now U.S. Pat. No. 3,499,682 dated Mar. 10, 1970; and application Ser. No. 616,208, filed Feb. 15, 1967, now U.S. Pat. No. 3,542,907 dated Nov. 24, 1970.

The present invention relates to the preparation of a sparingly cross-linked organic polymer having recurring hydrophilic groups in the molecule thereof under substantially anhydrous conditions. More specifically, the copolymer is a copolymer of a monoolefinic hydrophilic monomer with a small amount of a cross-linking agent.

In one aspect of the invention the polymerization is carried out in the absence of a solvent.

In another aspect of the invention the polymerization is carried out in a water miscible solvent which is either (a) a swelling agent for the polymer or (b) is not a swelling agent for the polymer.

If no swelling agent is employed, e.g., if the polymerization is carried out in the absence of a solvent, or if a swelling agent is employed but is gradually removed by drying there is obtained a xerogel. As explained in parent U.S. Pat. No. 3,361,858 the term "xerogel" as employed in this specification and the appended claims generally indicates a colloidal material hard enough to permit cutting and machining, and having the approximate consistency of commercial glue. The water content of a xerogel prepared by removal of water from a hydrogel generally is between 0 and 10 percent, but it is usually more practical to identify a xerogel by its hardness to touch and by its brittleness than by any numerically expressed property. It is characteristic of a xerogel that it is converted to a hydrogel by contact with water.

As pointed out in application Ser. No. 318,627 a contact lens is prepared by rotating a polymerization mixture about an axis, the mixture consisting essentially of a major amount of polymerizable monomer, a minor amount of a cross-linking agent for the monomer, a polymerization catalyst and a solvent. The mixture is rotated at a speed of rotation sufficient to cause radially outward displacement of a portion of the mixture away from the axis under centrifugal force and against the force of gravity. The mixture is rotated for a period of time sufficient for the polymerization of the monomer with the cross-linking agent to form a shape retaining body. Thus using a mixture of ethylene glycol monomethacrylate 54.7 parts, diethylene glycol monomethacrylate 17.2 parts and diethylene glycol dimethacrylate 0.6 part copolymerization was accomplished by rotating for 8 minutes followed by heating at 85°C. for 20 minutes using 1.1 part ammonium persulfate as a catalyst.

Unless otherwise indicated in the present specification and claims all parts and percentages are by weight.

As the solvent there is used 5 to 50 percent, preferably 15 to 40 percent, of the mixture of organic solvents readily soluble in water such as water soluble lower aliphatic monohydric alcohols as well as polyhydric alcohols such as glycols and glycerol, dioxane and the like. When an anhydrous polymerization medium such as dioxane is used. ionic polymerization catalysts such as an alkoxy lithium compound may be employed After the lens blank is completed it can be immersed in water for a sufficient time to absorb water and form a hydrogel such as described in Wichterle U.S. Pat. Nos. 2,976,576 or 3,361,858.

In making such copolymers the monoolefinic polymer is preferably a water soluble monoester of an acrylic acid or methacrylic acid with an alcohol having an esterfiable hydroxyl group and at least one additional hydroxyl group. The most preferred ester is ethylene glycol mono methacrylate but there can also be used diethylene glycol monomethacrylate and glycol acrylates. Acrylamide and methacrylamide are also useful as the monoolefinic compound. The preferred cross-linking agent is a water soluble diester of acrylic or methacrylic acid with an alcohol having at least two hydroxyl groups or an amide of such an acid. Typical examples of such cross-linking agents are ethylene glycol dimethacrylate, N,N'-methylene-bis-methacrylamide, diethylene glycol dimethacrylate, glycerine trimethacrylate and the like. Other cross-linking agents can be used, e.g., diallyl malate, diallyl monoglycol citrate, allyl vinyl malate, glycol vinyl allyl citrate, monoglycol monoallyl citrate, monoglycol monoallyl fumarate, polyester of maleic anhydride with triethylene glycol having a sufficiently low molecular weight to be water soluble.

The cross-linking agent is preferably employed in an amount of 0.1 to 1.9 percent of the mixture including the solvent.

Application Ser. No. 423,034 also is directed to making soft contact lenses by synthesizing a cross-linked hydrogel in a rotating mold. The monoolefinic monomers employed can be ethylene glycol monomethacrylate and diethylene glycol monomethacrylate while ethylene glycol bis methacrylate can serve as the cross-linking agent. The monoolefinic monomer is the main component. The monomer mixture can be anhydrous or it can contain glycol or glycerol.

The products of the present invention have many uses. Thus they can be used for correcting refraction errors of the eye for example by making soft and flexible contact lenses.

I have also prepared flexible contact lenses by polymerizing a suitable aqueous monomer mixture in a rotating concave mold. The polymer produced is sparingly cross-linked so as to be insoluble in aqueous liquids, yet has a large number of hydrophilic functional groups to retain water in a hydrogel structure which has the desired mechanical properties. There are disadvantages in such a process.

The two optical surfaces of the lens are formed simultaneously during polymerization. The outer lens surface is shaped by contact with the smooth mold surface, and the inner lens surface is shaped by the joint action of centrifugal forces and of surface tension in the polymerization mixture. Since the mold diameter is normally between 6 and 14 millimeters, the influence of surface tension on the ultimate lens shape is quite substantial.

The edge of a contact lens formed by polymerization in a rotating mold may not be entirely regular. Small recesses may occur because of microscopic inhomogeneity in the portion of the mixture exposed to ambient atmosphere in a very thin layer near the edge, and minute differences in wetting properties of the mold surface may cause flash or feather edge formation beyond the line of the intended edge. While such small irregularities neither cause irritation of the wearer's eye nor affect the optical quality of the lens, they are objectionable because they may give an impression of poor workmanship in an object in which precision is generally of the utmost importance.

It is not possible or not practical to remedy minor defects of the type described in a soft, flexible contact lens by mechanical working. It has also been found very difficult to dry the hydrogel lenses made from the aqueous monomer mixture until they are hard enough to permit working with tools. The drying process inherently causes shrinkage, and it is very difficult to control the shrinkage in such a manner that the relationship of all significant dimensions is maintained.

Lenses may be cut and polished in a conventional manner from xerogel blanks which are sparingly cross-linked polymers capable of absorbing water, but not originally containing water or an equivalent swelling agent. A lens blank of the xerogel material is mechanically worked until it constitutes a replica of the desired lens on a reduced scale, and is then immersed in a swelling agent, such as physiological saline solution until it assumes the desired dimensions. The lenses so produced can readily be prepared free from edge defects, but the individual cutting and polishing operations are as costly as those performed on more conventional hard lens materials, and are justified only for special lenses not capable of manufacture by polymerization in a rotating mold.

An object of the instant invention is a method of preparing contact lenses which are as free from edge defects as those cut and polished from xerogel blanks, yet are not much more costly to prepare than those obtained by polymerization in a rotating mold.

Another object is to prepare novel hydrophilic polymers.

A further object is to develop novel methods of preparing hydrophilic polymers.

I have found that advantages over other methods are available if a mixture of suitable monomers substantially free from solvents or swelling agents is polymerized in a rotating mold to form a hard blank which differs from the intended lens by predictable dimensional factors due to the absence of the liquid constituent of the hydrogel ultimately formed. If the blank has edge defects of the type discussed, they are readily corrected by grinding the edge of otherwise selectively removing material from the annular edge portion. The corrected lens blank may then be soaked in solvent to remove residual monomer, components or decomposition products of the polymerization catalyst, and like impurities, and is then stored in a solution isotonic with human tissues, such as an aqueous solution of 0.8 percent sodium chloride or a 1.0 percent sodium bicarbonate solution, as is well known in itself. A small amount of disinfectant may be dissolved in the storage solution in which the lens assumes its ultimate shape and dimensions.

It will be appreciated that the dimensions of the mold employed for polymerizing the solvent-free monomer mixture must be smaller than those of the lens ultimately to be produced by a factor which is readily determined by experiment for any specific polymerization mixture and the chosen operating conditions. The factor by which mold dimensions have to be reduced relative to desired ultimate lens dimensions remains constant if no more than ordinary care is taken in successive runs.

The volume of polymerization mixture employed in the method of the instant invention is significantly smaller in other methods in which sufficient solvent or swelling agent is initially present to produce a gel structure immediately in the mold. For contact lenses having a diameter of 6 to 14 millimeters, the amount of solvent-free monomer mixture is actually so small that gas bubbles do not occur even if the polymerization rate is sharply increased over that recommended in the earlier method by maintaining the temperature of the mixtures at 50°C. or higher.

The hard lens blanks formed in the instant method have optically curved inner and outer faces. These faces may be subjected to secondary shaping operations by means of tools, if so desired, in order to compensate for special conditions of the wearer's eye, but this is not usually necessary. The edges are cut and polished. This is of advantage not only in removing minor defects as mentioned above, but also permits a thin edge to be formed on relatively thick-edged blanks such as those produced in molds having an annular sharp edge or groove for limiting the overall dimensions of the polymerizate, and particularly those having high negative refraction values. A thin edge which is very flexible is essential for smooth movement of the eyelid over the contact lens without irritation.

The hard lens blanks can be shipped as such prior to any shaping.

The lens perimeter may also be cut to a shape which lacks axial symmetry and may even be irregular. Such shapes are employed in conventional contact lenses of relatively large diameter to cause automatic angular orientation of the lens relative to the optical axis of the eye. Asymmetry obtained by cutting the edge portions has the same effect in the contact lenses of the invention, and is beneficial in the correction of anastigmatism. The lens is preferably cut in such a manner that a portion of the otherwise circular lens projects toward a corner of the eye.

The solvent employed for removing residual or decomposed catalyst which is not soluble in water should be readily soluble in or miscible with water so that the solvent is removed by storing the lens in an aqueous solution. Water-soluble catalyst and water-soluble decomposition products, of course, may be removed by diffusion into an aqueous storage solution, and the solvent soaking step may be omitted.

Ethanol, if suitable for catalyst employed, is preferred as the soaking solvent. It has some swelling effect on hydrophilic polymers employed in this invention, and is readily replaced by water in the gel structure formed by swelling.

The aqueous swelling solution in which the ultimate lens shape is attained must be approximately isotonic with living human tissue, and must be free of toxic material. Its composition is not otherwise critical. It may contain a buffer to maintain a desired pH value, and the use of disinfectants has been mentioned above. Boric acid in very small amounts has been found useful for maintaining pH and because of its mild disinfectant effect.

The polymerizates of the invention which are substantially free from swelling agent normally adhere firmly to the mold in which they were produced. If the mold is provided with an axial stem, the lens blank is conveniently handled during mechanical working with the mold. The stem may be inserted in the chuck of a lathe, and the blank may be shaped by cutting with conventional cutting tools. Polishing pastes, conventional in themselves, are preferably employed for polishing of the edge or trim portion which also may be preformed on the lathe.

If the mixture would be too brittle for working without plasticizer, a very small amount of a water soluble liquid such as ethylene glycol or glycerol may be added to the polymerization mixture. The use of a small amount of plasticizer is generally advisable if edge portions of the lens blank are to be cut away by means of sharp tools.

The cut and polished lens blank separates readily from the mold when contacted with a swelling agent, such as ethanol or water.

The polymerization catalyst system is chosen to suit the specific monomers employed. The catalyst or catalysts must be soluble in the monomers in the substantial absence of solvent, particularly water. If relatively high operating temperatures can conveniently be maintained over extended polymerization periods, dibenzoyl peroxide or azobis-isobutyronitrile may be employed as catalysts. If higher polymerization rates are to be achieved at relatively low temperature, redox catalyst systems are preferred. The oxidizing component of the system may be dibenzoyl peroxide, di-isopropyl percarbonate, methylethylketone peracetal, maleic hydroperoxide, or the like, and may be combined with known reducing agents such as p-toluene sulfinic acid and its derivatives. Trace amounts or heavy metals in soluble form are beneficial. Cuprous benzoate and its pyridinium complex, and cobalt naphthenate are typical of heavy metal accelerators well known in themselves, but other salts of copper, iron or cobalt may be employed in the usual manner. Isopropyl percarbonate alone has been found particularly useful at polymerization temperatures somewhat above room temperature.

The practically water-free, i.e., anhydrous, mixtures of monomers and catalysts used in the method of the invention must be prepared at temperatures low enough to minimize polymerization outside the mold. Polymerization is initiated in the mold by heating the mixture to a suitable temperature, which may be between 30° and 60°, depending on composition.

Polymerization may also be initiated or accelerated by ultraviolet light or by ionizing radiation, by chemical initiators, or by sensibilizing agents which make the mixture responsive to light in the visible range of the spectrum.

It is not necessary to rotate the polymerization mixture with the mold unit until polymerization is completed. The mixture gels and becomes adequately shape retaining before it is fully cured and hard enough to permit mechanical working. Curing may be completed in the stationary mold.

EXAMPLE 1

A polymerization mixture was prepared from 15 parts methacrylamide, 80 parts ethylene glycol monomethacrylate containing 0.4 percent ethylene glycol bis-methacrylate, and 5 parts dibenzoyl peroxide. 50 milligrams of the mixture were dropped into a spherically concave mold having a diameter of 5 mm. The mold was rotated at 400 r.p.m. in an inert atmosphere of oxygen-free helium at a temperature of 80°C.

The copolymerization was completed in 6 hours, but gelation took place much earlier, and it was not necessary to rotate the mold during the entire polymerization period. The lens adhered firmly to the mold which had an axial stem. The stem was placed in the chuck of a lathe, and the edge of the lens was ground with an oil suspension of powdered alumina.

After machining, the lens and mold were washed and finally immersed in hot 85 percent ethanol whereupon the mold separated from the lens. The lens then washed with distilled water, and ultimately stored in 0.8 percent aqueous sodium chloride solution until osmotic equilibrium was reached. The lens either before or after machining could be shipped without being treated with water or other liquid.

EXAMPLE 2

A mixture of approximately 97 percent (by weight) ethylene glycol monomethacrylate, 0.25 percent ethylene glycol bis-methacrylate, 0.25 percent diethylene glycol bis-methacrylate, and 2.0 percent ethylene glycol was cooled to −10°C. At that temperature, 0.2 percent diisopropyl percarbonate were admixed as the catalyst.

60 milligrams of the catalyzed mixture were metered into a glass mold having the shape of a hemisphere of 7.5 mm diameter with a slightly flattened bottom. The mold was rotated 80 minutes at 420 r.p.m. in carbon dioxide atmosphere free from oxygen while the mold temperature was kept at 60°C. whereupon copolymerization was complete.

The lens, while still attached to the mold, was secured in a lathe, as described in Example 1, and its rim or edge was ground until perfectly smooth and flat. After preliminary cleaning with 50 percent ethanol, the lens and mold were immersed in the same solvent whose temperature was kept at 70°C. The lens swelled somewhat and separated from the mold.

The lens was removed from the alcohol bath after 15 minutes, was washed further in running deionized water at 70° − 80°, and was ultimately stored in physiological saline solution. When equilibrium was reached, the linear dimensions of the lens had increased 17 percent over the corresponding dimensions of the hard polymerizate originally produced.

Those skilled in the art will readily substitute other suitable materials in the procedures of the preceding Examples, e.g., the other monomers set forth in the present specification. The copolymers of major amounts of monoesters of acrylic and methacrylic acid with polyhydric alcohols and of minor amounts, preferably less than one percent, of diesters of the same acids with the same alcohols may be replaced by other physiologically tolerated, transparent polymers capable of forming hydrogels because of numerous repeating hydrophilic radicals or atom configurations. The polymerization mixture may contain acrylamide, the acrylates and methacrylates of glycerol, and the acrylates and methaacrylates of polyhydric alcohols having more than three hydroxyl radicals. Polyhydroxyethers may replace the polyhydric alcohols as exemplified by diethylene glycol in the diethylene glycol bismethacrylate of Example 2. Other monomers suitable for the copolymerization mixture of the invention include glycol diesters of polymerizable dicarboxylic acids such as itaconic and maleic acid, monoallyl esters of a wide variety of hydroxycarboxylic acids such as hydroxy-propionic acid, tartaric acid, and malic acid; monoallyl and vinyl ethers of compounds having two or more hydroxyl radicals such as glucose, mannitol, sorbitol, and pentaerythritol. Diesters and diethers, triesters and triethers of the same polyvalent acids or alcohols may be used as cross-linking agents. Diesters of the aforementioned dicarboxylic acids with allyl alcohol are merely exemplary of additional suitable cross-linking agents.

If the polymerization mixture is entirely free from compounds which readily produce ions, the aforementioned free radical catalysts may be replaced by anionic or cationic catalysts suited for the specific monomers employed.

The nature of the oxygen-free inert gas employed as a blanket during polymerization is irrelevant in itself. Nitrogen and argon are typical of gases commercially available that may be employed instead of the inert atmospheres referred to in the Examples.

The present invention is also suitable for making contact lenses which are soft and resilient hydrogels of sparingly cross-linked synthetic polymers which prevent "Sattler's veil" a haze or veil which appears to cover the field of view after a contact lens has been worn for a few hours. This is done by providing one or more small openings in the contact lens between its two major surfaces. Since water-free, relatively hard blanks can be produced by the present invention as set forth above, they may be drilled in a conventional manner prior to conversion to a hydrogel.

EXAMPLE 3

A hydrogel lens was prepared by polymerizing a polymerization mixture containing 60 parts ethylene glycol monomethacrylate, 19.7 parts diethylene glycol monomethacrylate, 0.3 parts ethylene glycol bismethacrylate, and 10 parts glycerol together with a small amount of diisopropyl percarbonate in a rotating mold. The polymer body so obtained was washed with distilled water, and stored in 1 percent aqueous sodium bicarbonate solution until approximate osmotic equilibrium was reached.

The lens was then placed on a rubber pad, and three holes were pierced in the peripheral portion of the lens at approximately equal angular spacings relative to the optical axis by means of a tubular metal punch whose sharpened rim had a diameter of 0.8 millimeters. The openings formed in the lens were found to vary somewhat in internal diameter along their length, and to have a minimum diameter of 0.5 millimeters.

As compared to an otherwise identical lens without openings, the perforated lens maintained its alignment with the optical axis of the wearer's eye and otherwise performed optically as well, yet it was removed much more easily. The appearance of Sattler's veil was delayed by several hours, and the veil when formed was markedly thinner.

EXAMPLE 4

A hard contact lens blank was prepared by polymerizing an anhydrous mixture of ethylene glycol monomethacrylate with 0.4 percent ethylene glycol bismethacrylate and with a small amount of diisopropyl percarbonate as polymerization initiator. Using a twist drill, two 0.25 mm holes were drilled in a diameter of the blank at points equidistant from the center and the rim of the blank. The blank was then cut, ground and polished, thoroughly washed with 96 percent ethanol, rinsed several times with distilled water, and finally immersed in a 1 percent solution of sodium bicarbonate in water. The properties of the lens so formed were closely similar to those described in Example 3.

It is a well known fact that water-swollen hydrophilic lenses cannot be further machined or otherwise shaped by means of any known technologic processes. The present invention in one of its embodiments utilizes the thermoelasticity and shape-memory of the dry gel material (xerogel) in order to give one of the lens surfaces such a regular and simple shape at a temperature above the softening point of the gel, as is best suited to the further treatment of this surface, whereupon the lens is allowed to cool below the glass transition point, or down to room temperature. The lens retains in this state, and at this low temperature, its newly acquired shape, and permits treatment by means of any conventional machining, grinding or polishing tool. After this finishing of one of the lens surfaces the lens may again be heated to be brought once more into the elastic state, in order to allow the other surface to be shaped. After finishing operations on this surface also, the lens may be either stored in this deformed state, or it may be relaxed to the initial shape by heating. Return to the initial state may, of course, also be achieved simply by letting the lens swell in water or in suitable solutions or other solvents. It is evident that it is simplest to bring the lens back to equilibrium directly in physiologic solution, by which means it is immediately prepared for application to the cornea.

Naturally, plane or spherical surfaces are best suited for mechanical treatment. In the spherical surfaces, which correspond to their radius to the radius of the average cornea, multiplied by the coefficient of linear swelling of the gel in water, it is easily possible to measure the central thickness, weight or volume and optical strength of the lens. In order to recalculate the linear parameters of the swollen lens multiply them simply by the swelling coefficient. The optical strength is calculated by dividing the dioptric value obtained for the dry lens by the refractive index of the dry gel decreased by one, multiplying by the refractive index of the swollen gel decreased by one and moreover by dividing by the swelling coefficient.

It is apparent that the surfaces best suited for finishing are either a plane or a spherical surface. Other surfaces, however, may also be used, allowing very interesting modifications of surfaces and thus of the optical and other properties of the lenses. Thus, e.g., the inner or outer surfaces of the lens may be shaped into a precise cylindrical surface, which may then be ground and polished into a plane. By means of this procedure we achieve very simply the fact that after relaxation the cylindrical component of refraction is retained in the lens giving thus a lens for an estigmatic eye. If the lens is pressed onto a matrix with planar surface, in which grooves are etched out or engraved, the material of the lens is pressed into these grooves when this imprint on the lens is now ground down to a plane, grooves are formed in the lens at the lines of contact with the matrix grooves after relaxation of the lens by swelling or heating. This technique may be used in order to form a system of channels on the inner surface, which facilitate the exchange of liquid below the lens, improving the nutrition of the cornea.

EXAMPLE 5

A contact lens, prepared by rotating a monomer mixture composed of 99.5 percent glycolmonomethacrylate, 0.4 percent glycoldimethacrylate and 0.1 percent isopropylpercarbonate in a spherical mould 6 mm. in radius at 470 revs./min. was washed in distilled water and dried in a drying chest at 105°C. Then a rubber stopper, preheated to 150°C. was used to press the lens onto a ground glass plate equally preheated, the surface of the plate having been wetted with pure paraffin oil. As soon as the lens had been heated till soft, a period of 10 seconds being required, it flattens on the plate and remains fixed to the ground surface by a "suction--cup" effect. After cooling the glass the lens can be easily removed. Its planar surface, formed from its original, somewhat irregular concave surface, is then equalised on a planar grinding plate, covered with fine woolen fabric impregnated with a suspension of finely ground ceric oxide in xylene. The polished lens is left to swell in physiologic solution.

EXAMPLE 6

The same lens as in Example 5 was pressed, after drying, onto the polished surface of a steel ball 6.35 mm. in radius at 155°C. Adhesion may be achieved either by means of a foil of silicone rubber drawn over an annular drum, or by means of fine elastic knitted fabric of crimped polyester fabric. In the pressed-down state the lens is cooled, its inner surface is polished on a spherical polishing plate 6.35 mm. in radius and the lens is measured on a focometer, as used conventionally to measure hard contact lenses. A value of $-7.25$ D has been found. Since the refractive index of the dry gel is 1.52, that of the swollen gel 1.42 and the swelling coefficient is 1.17, the value of this lens calculated for a cornea curvature of $6.35 \times 1.17 = 7.5$ mm. is $$-7.25 \cdot 0.42/1.17 \cdot 0.52 = -5.0 \text{ D}.$$

In still another aspect of the present invention there is employed a water miscible solvent under substantially anhydrous conditions to prepare sparingly cross-linked organic polymers and to make shaped bodies therefrom, e.g., as hydrogels. The shape retaining hydrogels are useful as contact lenses, as semipermeable membranes, etc. The polymers are prepared by copolymerizing hydrophilic organic monomers having an olefinic double bond with a small amount of a polymerizable cross-linking agent.

Suitable olefinically unsaturated monomers include ethylene glycol monomethacrylate, ethylene glycol acrylate, diethylene glycol methacrylate and acrylate, acrylamide and methacrylamide, and monovinyl and monoallyl esters of hydroxycarboxylic acids such as tartaric or malic acid.

Cross-linking agents capable of copolymerization with one or more the the above olefinic monomers in an obvious manner include the diacrylates and dimethacrylates of ethylene glycol or diethylene glycol, di- or triesters of tartaric acid with vinyl or allyl alcohol, the corresponding diester of malic acid, N,N'-methylene-bis-methacrylamide and N,N'-methylene-bis-acrylamide, sulfonated divinylbenzene, divinylsulfon, hexahydro-1,3,5-triacrylyltriazine, and the like. The amount of the polymerizable cross-linking agent should generally be between 0.1 and 2.0 percent of the olefinic monomer which constitutes the bulk of the monomer mixture.

A wide variety of inert liquid solvents does not interfere with the copolymerization reaction. If at least a portion of the solvent forms a homogeneous liquid phase with the monomers originally present, the solvent is dispersed in the copolymer ultimately formed to constitute a gel therewith. If the solvent is miscible with water, it may be replaced in the gel structure by water when the polymerizate is contacted with an aqueous liquid.

Ethylene glycol or glycerol do not react with the monomers nor with the cross-linking agents mentioned above, and do not interfere with polymerization. They are miscible with water, and are therefore typical of the non-aqueous solvents which may be employed in the method of the invention.

Generally, all water-soluble monoolefinic compounds are suitable as principal monomers in the process of the invention if they do not ionize or otherwise decompose in the presence of water, and any diolefinic compound which is soluble in the principal monomer and similarly resists decomposition by water may serve as a cross-linking agent.

The mono- and polyacrylates and -methacrylates of dihydric and polyhydric alcohols are the preferred principal monomers and cross-linking agents as far as they meet the above criteria. Suitable alcohol moieties in such esters other than those mentioned above include mannitol, sorbitol, and other alcohols derived from sugars, pentaerythritol, polyvinyl alcohol, and the like. Ethylene glycol monomethacrylate is the preferred monoolefinic compound.

Additional examples of suitable inert solvents miscible with water are foramide, dimethylformamide, dimethylsulfoxide, the glycol esters of lactic acid, and the liquid polyethyleneglycols.

It is characteristic of the copolymers of my earlier invention U.S. Pat. No. 2,976,576 that the sparingly cross-linked polymers reach osmotic equilibrium with water or aqueous liquids at a water content of 40 percent or less. If the polymer originally contains less water than 40 percent alone or admixed with the corresponding amount of a non-aqueous solvent, it absorbs water from an ambient aqueous medium, and its volume increases by swelling. This fact was utilized theretofore in separating a hydrogel from a mold in which it had been formed by polymerization. If the polymerization mixture originally contained less than 40 percent water or a corresponding amount of solvents replaceable by water, the gel formed during polymerization could simply be removed from the mold by immersing the mold with its contents in water. The molded hydrogel spontaneously separated from the mold when it swelled without damage to its surfaces, a valuable feature in the manufacture of hydrogel contact lenses.

The swelling ability of a copolymer of the type described, regardless of the chemical nature of its constituents, decreases as the original solvent content approaches a water equivalent of approximately 40 percent, and it was therefore considered necessary heretofore to hold the solvent content of the polymerization mixture well below this limit if polymerization took place in a mold, and the polymer body was to be removed from the mold with a minimum of inconvenience.

I now have found that separation of a polymer from a mold in which it was formed is also readily accomplished if the solvent content of the polymerization mixture substantially exceeds the critical 40 percent water equivalent value, and that this property also is practically independent of the nature of the principal monomer, of the cross-linking agent, and of the solvent.

When a gel prepared from a mixture containing more than 40 percent or the equivalent amount of another water miscible solvent is placed in contact with water or an aqueous liquid, the gel shrinks by outward diffusion of water if it originally contained water as the solvent, or by outward diffusion of the non-aqueous solvent at a rate smaller than the inward diffusion of water from the ambient aqueous medium. The shrinkage is predictable and is directly related to the excess solvent present over the 40 percent equivalent.

Preparing a gel by copolymerization of a mixture of a mono-olefinic monomer with a small amount of a cross-linking agent in a mold in the presence of an amount of over 40 percent of a solvent miscible with water has important advantages over the previously employed method.

The molded object reproduces the shape of the mold more accurately though on a different scale when it shrinks from a configuration corresponding to that of the mold then when it expands from the conforming configuration. Inaccuracies present in the mold are reduced rather than enlarged. This is particularly important in the molding of contact lenses where highest accuracy is desirable, and where the manufacturing tolerance for the mold in units of length is a significant factor in the quality of the lens. The tolerance is enlarged when the molded lens is subsequently swelled, and reduced, when the lens is shrunk after molding. The size of the mold for producing a lens of given dimensions is greater with the instant method than with that used heretofore. The lens mold therefore is more easily ground and polished to the necessary finish and accuracy.

The shrinkage of the molded gel is uniform in all dimensions. The hydrogel ultimately obtained by contact with water or an aqueous liquid such as isotonic saline solution is an exact replica of the mold cavity in which it was produced, though on a smaller scale. The dioptric power of the lens is not affected by the shrinkage, but overall mechanical and optical properties are improved in a manner diametrically opposite to what would normally be expected. The properties of synthetic fibers, for example, normally deteriorate if the constituent polymer is prepared with an excess of solvent.

It is believed that the improved properties of lenses and similar devices prepared from sparingly cross-linked hydrogel blanks containing an excess of solvent by shrinkage in contact with an aqueous medium are due to relaxation of internal stresses which develop during polymerization, and which tend to be increased by swelling after release from the mold. The shrinkage occurring when cured polymerization mixtures of this invention are contacted with an aqueous medium also is believed to enhance coiling of the polymer chains, and this accounts at least in part for the improved toughness, resilience, and tear resistance of the hydrogel bodies produced thereby.

Optical anisotropy is occasionally observed when molded hydrogel blanks of the type described and containing less than 40 percent water or its equivalent are swelled by contact with an aqueous medium after polymerization. Such anisotropy may become visible as a haze or slight opacity, and occurs more frequently when ethylene glycol monomethacrylate alone is used as the principal monomer than with a mixture of this monomer with monomethacrylates of diethylene glycol or a polyethylene glycol. Yet, it is economically more advantageous to use as few ingredients in a polymerization mixture as is possible, and ethylene glycol methacrylate is a particularly convenient monomer because of its low cost and chemical stability, and because it is easily prepared and readily purified by vacuum distillation at low temperature. Lenses prepared from polymerization mixtures in which ethylene glycol monomethacrylate is the sole monoolefinic monomer and which contain more than 40 percent water miscible solvent never show haze nor other symptoms of optical anisotropy.

The ultimate size of the lens after shrinking in water is independent of the nature of a water-miscible, inert non aqueous solvent originally present in the polymerization mixture and the resulting gel, but is only a function of the initial volume of the non aqueous solvent. Although a copolymer of ethylene glycol methacrylate with a small amount of cross-linking agent prepared without solvent will swell to 700 percent of its volume when in equilibrium with dimethyl formamide, to 450 percent with ethylene glycol, and to only 101 percent with glycerine, polymer gels of the same monomers and cross-linking agent containing equal volumes of these three solvents, greater than 40 percent of the total polymerization mixture, shrink to the same size when in contact with water.

The amount of inert liquid solvent added to the polymerization mixture has little or no effect on the composition of the product obtained after shrinking in contact with water, as long as the solvent is originally present in an amount substantially greater than 40 percent of the polymerization mixture and smaller than about 80 percent. The shrinkage occurs when a non-aqueous water-miscible solvent is replaced in a polymer gel of the invention by the water of an ambient aqueous medium is predictable because it is a unique function of the percentage of solvent in the polymerization mixture. For small amounts of shrinkage, this relationship is adequately expressed by the equation $$b = a \sqrt[3]{1 - p/100}$$

wherein $b$ is the linear shrinkage of the molded gel from the internal dimensions of the mold, $a$ is the linear contraction occurring during polymerization of the monomer mixture when free from solvent, and $p$ is the percentage of inert water-miscible solvent in the polymerization mixture, $a$ and $b$ being expressed in the same units of length.

The polymerization is preferably performed in the presence of catalysts or initiators known in themselves. Various compounds or redox systems developing free radicals under the conditions of polymerization may be employed as is conventional, and ionic catalysts are useful in anhydrous polymerization mixtures, such as those containing dimethyl sulfoxide as a solvent, if the monomers employed respond to ionic catalysts. Peroxides, hydroperoxides, peracetals, and azo-compounds that are at least partly soluble in the polymerization mixture have been used successfully in the method of the invention. Means other than chemical may provide the energy for initiating polymerization, and it is conventional to use electromagnetic radiation of short wave length or ionizing radiation, such as ultraviolet or gamma rays.

The catalysts heretofore employed with the monomers of the invention are suitable for the process of the invention, and the catalysts or initiators are not in themselves relevant to this invention.

EXAMPLE 7

A polymerization mixture was prepared from 15 parts (by weight) of a monomer mixture consisting of 99.7 percent ethylene glycol monomethacrylate and 0.3 percent ethylene glycol bis-methacrylate as a cross-linking agent, 85 parts glycerol, and 0.1 percent diethyl percabonate as a catalyst. The mixture was poured into a mold assembled from two polished glass plates separated in parallel alignement by a thin silicon rubber tube which served as a seal. A frame including springs applied to the free faces of the glass plates held the mold assembled.

The polymerization mixture was introduced into the mold cavity between the glass plates, and was held there 20 minutes at 65°C. whereupon polymerization was completed, and a transparent foil free of bubbles was peeled from the glass plates. It was washed in water until the glycerol was removed and stable dimensions at 63.7 percent of the original dimensions, as molded, were reached. The volume of the foil when in equilibrium with the ambient water was 39 percent of the volume after molding. The foil had high strength for a material of this type, and excellent optical properties.

When the same monomer mixture was combined with glycerol at a ratio of 80 parts monomers to 20 parts glycerol, the foil prepared in the manner indicated above swelled 109.4 percent of its molded linear dimensions and by 31 percent of its molded volume when the glycerol was replaced in the gel structure by water diffused inward from an immersion bath. The mechanical strength of the swollen foil was lower by a small, but significant amount that of the foil produced with 85 parts of glycerol, and its optical properties were similarly inferior.

EXAMPLE 8

50 ml. of a mixture of 98.7 percent ethylene glycol monomethacrylate, 0.3 percent diethyleneglycol-bis-methacrylate, and 1 percent ethylene glycol were mixed with 50 ml. formamide and an amount of azo-bis-isobutyronitrile corresponding to 0.2 percent of the combined monomers. The polymerization was performed in the mold described in Example 1 at 75°C. in 50 minutes. The polymer foil was immersed in flowing water until it reached equilibrium at 91 percent of its original linear dimensions. The membrane obtained was fully transparent and of relatively high mechanical strength.

When the concentration of formamide in the polymerization mixture was increased to 60 percent by volume, a similar blank was obtained by polymerization, and shrank to 81.3 percent of its linear dimensions when contacted with water. Practically identical hydrogel membranes were produced when the formamide was replaced by an equal volume of dimethylforamide or ethylene glycol.

EXAMPLE 9

An upwardly open mold having a hemi-spherical cavity of 19.3 mm. diameter was charged with 0.21 g of a mixture consisting of 30 percent (by weight) ethylene glycol methacrylate, 0.1 percent ethylene glycol-bis-methacrylate, 69.7 percent ethylene glycol, and 0.2 percent diisopropyl percarbonate. The mold was rotated about the vertical radius of its cavity 346 rpm in an argon atmosphere while its contents were kept at about 60°C. by means of an infrared radiation heater. The polymerization mixture was gelled after 25 minutes, whereupon rotation was stopped, but heating was continued for 20 minutes.

The mold and its contents were then immersed in frequently changed warm water until all ethylene glycol had been washed from the gel, whereby the polymer body spontaneously separated from the mold. It had the shape of a contact lens of 12.4 mm. diameter whose circular edge was thin and pliable, yet sharply defined and of perfect configuration. The optical power of the lens was −7 D, its external radius of curvature 7.25 mm., and the internal radius of curvature of the central portion of the lens was 6.5 mm.

Analogous results were obtained when ethylene glycol methacrylate was replaced as the principal olefinic monomer by the aforementioned esters having other acid or alcohol moieties, more specifically the monoesters of acrylic acid with polyhydric alcohols such as glycol, the amides of acrylic and methacrylic acid, and the monovinyl and monoallyl esters of hydroxycarboxylic acids having saturated carbon chains.

Diesters of acrylic and methacrylic acid with the aforementioned polyhydric alcohols are the preferred crosslinking agents if the polymer hydrogel ultimately produced is intended as a lens, but other cross-linking agents soluble in the principal monomer and partly enumerated above may be freely chosen if highest optical qualities of the hydrogel are not required, as in membranes for dialyzers and the like.

While the invention has been described with particular reference to specific embodiments, it will be understood that it is not limited to the examples of the invention chosen for the purpose of the disclosure, but is to be construed broadly and limited solely by the scope of the appended claims.

Polymerization as indicated can be carried out at room temperature although lower temperatures and more elevated temperatures can be employed.

What is claimed is:

1. An article which is a contact lens blank or replica of a contact lens on a reduced scale, said blank or replica being characterized by the ability to form said contact lens substantially free of edge defects by contact with a swelling agent, said blank or replica being made of a substantially anhydrous sparingly cross-linked hydrophilic copolymer of a hydrophilic monomer having a single olefinic bond and a cross-linking agent capable of forming a three-dimensional cross-linked copolymer with said monomer, said polymer being capable of being swollen when in contact with water.

2. A blank or replica according to claim 1 wherein the copolymer is in the form of a xerogel.

3. A blank or replica according to claim 1 wherein the copolymer is a copolymer of a major amount of at least one water-soluble polymerizable monoester of acrylic acid or methacrylic acid and an alcohol having an esterifiable hydroxyl group and at least one additional hydroxyl group, and not more than 2% by weight of said copolymer of a cross-linking agent comprising a diester of said acid and said alcohol capable of forming a three-dimensional cross-linked copolymer with said monoester.

4. An article according to claim 3 which is a replica of a contact lens.

5. The replica as claimed in claim 4 wherein said alcohol is selected from the group consisting of ethylene glycol and diethylene glycol.

6. A replica as claimed in claim 4 wherein said monoester is at least predominantly ethylene glycol monomethacrylate.

7. A replica as claimed in claim 6 wherein said cross-linking agent is ethylene glycol dimethacrylate.

8. A replica as claimed in claim 4 wherein said cross-linking agent is present in an amount of 0.1 to 2 percent by weight.

9. A replica according to claim 4 which is in the form of a xerogel, the copolymer contains at least 98 percent by weight of said monoester and 0.1 to 2 percent by weight of said cross-linking agent.

10. A replica according to claim 9 wherein the monoester is ethylene glycol monomethacrylate and the cross-linking agent is ethylene glycol dimethacrylate.

11. A replica according to claim 9 wherein the cross-linking agent is present in an amount of 0.1 to 1.9 percent by weight.

12. A replica as claimed in claim 4 wherein said monoester is at least predominantly ethylene glycol monomethacrylate and said copolymer is admixed with up to 80 percent by weight, based on the weight of the total composition, of a water-miscible, inert non aqueous solvent selected from the group consisting of dimethyl formamide, ethylene glycol and glycerine.

13. An article according to claim 2 which is a blank having optically curved inner and outer faces.

14. An article according to claim 2 which is a replica.

15. An article according to claim 1 wherein the blank has optically curved inner and outer faces.

16. An article according to claim 1 which is a replica.

* * * * *

Disclaimer 3,822,089.—*Otto Wichterle*, Prague, Czechoslovakia. CONTACT LENS BLANK OR REPLICA MADE FROM ANHYDROUS SPARINGLY CROSS-LINKED HYDROPHILIC COPOLYMERS. Patent dated July 2, 1974. Disclaimer filed Mar. 12, 1975, by the assignee, *Ceskoslovenska Akademine Ved*.

The term of this patent subsequent to Jan. 2, 1985, has been disclaimed.

[*Official Gazette September 2, 1975.*]